United States Patent
Okubo et al.

(10) Patent No.: US 12,331,376 B2
(45) Date of Patent: Jun. 17, 2025

(54) NON-ORIENTED ELECTRICAL STEEL SHEET AND METHOD FOR PRODUCING SAME

(71) Applicant: JFE Steel Corporation, Tokyo (JP)

(72) Inventors: Tomoyuki Okubo, Tokyo (JP); Takaaki Tanaka, Tokyo (JP); Yoshiaki Zaizen, Tokyo (JP); Yoshihiko Oda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 711 days.

(21) Appl. No.: 17/420,209

(22) PCT Filed: Jan. 22, 2020

(86) PCT No.: PCT/JP2020/002045
§ 371 (c)(1),
(2) Date: Jul. 1, 2021

(87) PCT Pub. No.: WO2020/153387
PCT Pub. Date: Jul. 30, 2020

(65) Prior Publication Data
US 2022/0064751 A1    Mar. 3, 2022

(30) Foreign Application Priority Data
Jan. 24, 2019    (JP) ................. 2019-010323

(51) Int. Cl.
*C21D 9/46*    (2006.01)
*C21D 6/00*    (2006.01)
(Continued)

(52) U.S. Cl.
CPC ............... *C21D 9/46* (2013.01); *C21D 6/005* (2013.01); *C21D 6/008* (2013.01); *C21D 8/1222* (2013.01);
(Continued)

(58) Field of Classification Search
None
See application file for complete search history.

(56) References Cited

U.S. PATENT DOCUMENTS

2004/0016530 A1    1/2004    Schoen et al.
2009/0301609 A1    12/2009    Arita et al.
(Continued)

FOREIGN PATENT DOCUMENTS

CN    104160043 A    11/2014
CN    105950960 A    9/2016
(Continued)

OTHER PUBLICATIONS

Machine translation of JP 11-80834A. (Year: 1999).*
(Continued)

*Primary Examiner* — Xiaowei Su
(74) *Attorney, Agent, or Firm* — Buchanan Ingersoll & Rooney PC

(57) ABSTRACT

In a production of a non-oriented electrical steel sheet comprising subjecting a slab containing a particular composition to a hot rolling, a hot-band annealing, a cold rolling to form a cold-rolled sheet and a finish annealing, a rolling reduction of a final finish rolling pass in the hot rolling is not less than 10%, and a coiling temperature is not higher than 620° C., and a soaking temperature in the finish annealing is 600 to 800° C. to achieve such properties that a recrystallization ratio is less than 100% as an area ratio, a strength C is not less than 2.0 and a strength difference C−D is not more than 2.0, where C is a strength at $\Phi=0°$ and $\varphi_1=0°$ and D is a strength at $\Phi=20°$ and $\varphi_1=0°$ in a section of $\varphi_2=45°$ of ODF obtained in a central layer of a sheet thickness.

2 Claims, 2 Drawing Sheets

(51) Int. Cl.
*C21D 8/12* (2006.01)
*C22C 38/00* (2006.01)
*C22C 38/02* (2006.01)
*C22C 38/04* (2006.01)
*C22C 38/06* (2006.01)
*C22C 38/12* (2006.01)
*C22C 38/14* (2006.01)
*C22C 38/60* (2006.01)

(52) U.S. Cl.
CPC ......... *C21D 8/1233* (2013.01); *C21D 8/1266* (2013.01); *C21D 8/1272* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *C22C 2202/02* (2013.01)

(56) References Cited

U.S. PATENT DOCUMENTS

| | | | |
|---|---|---|---|
| 2012/0298267 | A1 | 11/2012 | Hu et al. |
| 2013/0167987 | A1 | 7/2013 | Kim et al. |
| 2015/0027590 | A1 | 1/2015 | Nakanishi et al. |
| 2017/0260600 | A1 | 9/2017 | Okubo et al. |
| 2019/0017138 | A1 | 1/2019 | Uesaka et al. |
| 2019/0382867 | A1 | 12/2019 | Zaizen et al. |
| 2020/0232059 | A1 * | 7/2020 | Fujimura ............ H01F 1/14775 |

FOREIGN PATENT DOCUMENTS

| | | |
|---|---|---|
| CN | 106574334 A | 4/2017 |
| CN | 107964631 A | 4/2018 |
| EP | 1001042 A1 | 5/2000 |
| JP | 6021330 A | 2/1985 |
| JP | H11080834 A * | 3/1999 |
| JP | 2000129409 A | 5/2000 |
| JP | 2005113185 A | 4/2005 |
| JP | 2006045613 A | 2/2006 |
| JP | 2006169611 A | 6/2006 |
| JP | 2008202070 A | 9/2008 |
| JP | 2010090474 A | 4/2010 |
| JP | 2012184497 A | 9/2012 |
| JP | 2013515166 A | 5/2013 |
| JP | 2017066469 A | 4/2017 |
| JP | 2018092979 A | 6/2018 |
| JP | 2018168413 A | 11/2018 |
| JP | 2018178197 A | 11/2018 |
| KR | 20010021967 A | 3/2001 |
| RU | 2318883 C2 | 3/2008 |
| RU | 2398894 C1 | 9/2010 |
| RU | 2409693 C2 | 1/2011 |
| TW | 201726939 A | 8/2017 |
| WO | 2018164185 A1 | 9/2018 |
| WO | 2018179871 A1 | 10/2018 |

OTHER PUBLICATIONS

Extended European Search Report for European Application No. 20 745 534.6, dated Jun. 2, 2022, 14 pages.
International Search Report for International Application No. PCT/JP2020/002045, dated Apr. 14, 2021, 6 pages.
Taiwanese Office Action for Taiwanese Application No. 109102580, dated Aug. 10, 2020, 4 pages.
Chinese Office Action with Search Report for Chinese Application No. 202080009795.6, dated Jul. 13, 2022, 11 pages.
Korean Office Action for Korean Application No. 10-2021-7021392, dated Sep. 8, 2022, with Concise Statement of Relevance of Office Action, 6 pages.
Russian Office Action for Russian Application No. 2021121634, issued Dec. 14, 2021, with translation, 13 pages.

* cited by examiner

NON-ORIENTED ELECTRICAL STEEL SHEET AND METHOD FOR PRODUCING SAME

CROSS REFERENCE TO RELATED APPLICATIONS

This is the U.S. National Phase application of PCT/JP2020/002045, filed Jan. 22, 2020, which claims priority to Japanese Patent Application No. 2019-010323, filed Jan. 24, 2019 and Japanese Patent Application No PCT/JP2019/034800, filed Sep. 4, 2019, the disclosures of these applications being incorporated herein by reference in their entireties for all purposes.

FIELD OF THE INVENTION

This invention relates to a non-oriented electrical steel sheet and a method for producing the same, and more particularly to a non-oriented electrical steel sheet having a high strength and a low iron loss and a method for producing the same.

BACKGROUND OF THE INVENTION

In recent years, development of motor drive systems has made it possible to control the frequency of the drive power supply, and there has been an increase in motors that operate at variable speeds or rotate at high speeds above commercial frequencies. A motor core is formed of a stator core fixed in a motor case and a rotor core rotating at a high speed, and centrifugal force is generated in the rotating rotor core. The magnitude of the centrifugal force is proportional to radius of rotation and proportional to the square of the rotating speed. Accordingly, a steel sheet as a raw material of a middle- and large-size rotor cores rotating at a high speed is demanded to have a high strength.

IPM motors are used in drive motors for electric vehicles, hybrid vehicles, etc., have a slit in the outer circumference of the rotor, and a magnet is embedded in the slit, where stress is concentrated in a narrow bridge portion supporting the magnet. Therefore, a steel sheet as a raw material of the rotor core, even a relatively small-size motor, is demanded to have a high strength.

In the motor rotating at a high speed, eddy current is generated by a high-frequency magnetic flux, which causes a decrease in motor efficiency and causes heat generation. Since a large amount of heat generation in the rotor causes demagnetization of the magnet, the raw material of the rotor core is demanded to be low in the iron loss even at a high frequency zone. Thus, a steel sheet being excellent in the balance between high strength and low iron loss is required as the raw material used for the rotor core.

A method for attaining high strength includes, for example, a method of adding a large amount of a solid-solution strengthening element such as Si, Al and the like to iron and thus forming a high alloy steel. This method can attain low iron loss and high strength at the same time and is preferably used. There is another method of using precipitation strengthening to achieve high strength by forming a high alloy steel, but the method has a problem that the precipitated second phase grains considerably block the grain growth in finish annealing or stress-relief annealing. Moreover, as a method for attaining high strength other than by forming high alloy steel, there is widely used a method of increasing strength by making crystal grains finer. This method comprises forming a motor core using a high-strength material and subjecting only the stator core to stress-relief annealing so as to cause grain growth, resulting in an advantage that the stator core has a low iron loss while the rotor core has a high strength.

Under such a situation, there are proposed other methods for increasing the strength of a non-oriented electrical steel sheet. For example, Patent Literatures 1 and 2 propose a method of attaining high strength by using non-recrystallized texture. Also, Patent Literature 3 proposes a method of controlling the configuration of non-recrystallized texture to suppress a variation in tensile strength and fatigue strength.

PATENT LITERATURE

Patent Literature 1: JP-A-2006-169611
Patent Literature 2: JP-A-2005-113185
Patent Literature 3: JP-A-2010-090474

SUMMARY OF THE INVENTION

The inventors have produced a non-oriented electrical steel sheet using a high-alloy steel as a raw material by applying the method disclosed in Patent Literatures 1 and 2, and as result, found that these methods have a problem that fatigue strength is largely varied. Although the method disclosed in Patent Literature 3 can suppress variations in tensile strength and fatigue strength, the Al and Mn contents are limited to a relatively low amount, causing a problem of low specific resistance and high iron loss at a high-frequency.

Aspects of the invention are made in consideration of the above problems inherent to the conventional methods, and an object thereof is to provide a non-oriented electrical steel sheet having a high strength (high tensile strength and high fatigue strength) and a low iron loss by using a high-alloy steel having a high Si and Al contents as a raw material and propose an advantageous method for producing the same.

In order to solve the problems, the inventors have made various studies, focusing on a combination technique of increasing the strength by using a high alloy steel material and increasing the strength by using a non-recrystallized texture. As a result, they have found that, in order to stably produce a non-oriented electrical steel sheet having a high strength (high tensile strength and high fatigue strength) and a low iron loss using the combination technique, it is effective to adjust the texture of a product sheet, and thus have aspects of the invention been accomplished.

Aspects of the invention based on the above knowledge include a non-oriented electrical steel sheet having a chemical composition comprising C: not more than 0.0050 mass %, Si: 3.2 to 5.0 mass %, Mn: not more than 2.0 mass %, P: not more than 0.02 mass %, S: not more than 0.0050 mass %, Al: 0.5 to 2.0 mass %, N: not more than 0.0050 mass %, Ti: not more than 0.0030 mass %, Nb: not more than 0.0010 mass %, V: not more than 0.0050 mass %, O: not more than 0.0050 mass %, provided that Si+Al≥4.0 mass %, and the remainder being Fe and inevitable impurities, in which
  a recrystallization ratio is less than 100% as an area ratio,
  a strength C is not less than 2.0, and
  a strength difference C−D is not more than 2.0, where C is a strength at $\Phi=0°$ and $\varphi_1=0°$ and D is a strength at $\Phi=20°$ and $\varphi_1=0°$ in a section of $\varphi_2=45°$ of ODF obtained in a central layer of a sheet thickness.

The non-oriented electrical steel sheet according to aspects of the invention is characterized by containing one or two selected from Sn and Sb by 0.005 to 0.20 mass % each, in addition to the above chemical composition.

The non-oriented electrical steel sheet according to aspects of the invention is characterized by containing one or more selected from Ca, Mg and REM by 0.0005 to 0.010 mass % each, in addition to the above chemical composition.

The non-oriented electrical steel sheet according to aspects of the invention is characterized by containing at least one selected from Cr: 0.01 to 5 mass %, Cu: 0.01 to 5 mass %, Ni: 0.01 to 5 mass %, Mo: 0.0005 to 0.1 mass %, W: 0.001 to 0.1 mass %, Co: 0.01 to 5 mass %, As: 0.001 to 0.05 mass % and B: 0.0001 to 0.005 mass %, in addition to the above chemical composition.

Moreover, aspects of the invention include a method for producing a non-oriented electrical steel sheet comprising subjecting a steel slab having a chemical composition described in any one of the above items to a hot rolling, a hot-band annealing, a single cold rolling or two or more cold rollings with an intermediate annealing between each rolling to form a cold-rolled sheet with a final sheet thickness, and a finish annealing, characterized in that a rolling reduction of a final finish rolling pass in the hot rolling is not less than 10%, a coiling temperature after the hot rolling is not higher than 620° C., and a soaking temperature in the finish annealing is 600 to 800° C. to achieve such properties that a recrystallization ratio is less than 100% as an area ratio, the strength C is not less than 2.0 and a strength difference C−D is not more than 2.0, where C is a strength at $\Phi=0°$ and $\varphi_1=0°$ and D is a strength at $\Phi=20°$ and $\varphi_1=0°$ in a section of $\varphi_2=45°$ of ODF obtained in a central layer of a sheet thickness.

The method for producing a non-oriented electrical steel sheet according to aspects of the invention is characterized in that a temperature of the steel sheet at an exit side of a first pass in a final cold rolling of the cold rolling is not lower than 80° C.

The method for producing a non-oriented electrical steel sheet according to aspects of the invention is characterized in that a rolling reduction of the first pass in the final cold rolling of the cold rolling is not less than 30%.

Aspects of the invention can stably provide non-oriented electrical steel sheets having a high strength (high tensile strength, high fatigue strength) and a low iron loss, which can favorably be used as a raw material of a motor core in a motor rotating at a high speed, a driving motor for electric vehicles or hybrid vehicles and so on.

DETAILED DESCRIPTION OF EMBODIMENTS OF THE INVENTION

Figure 1:
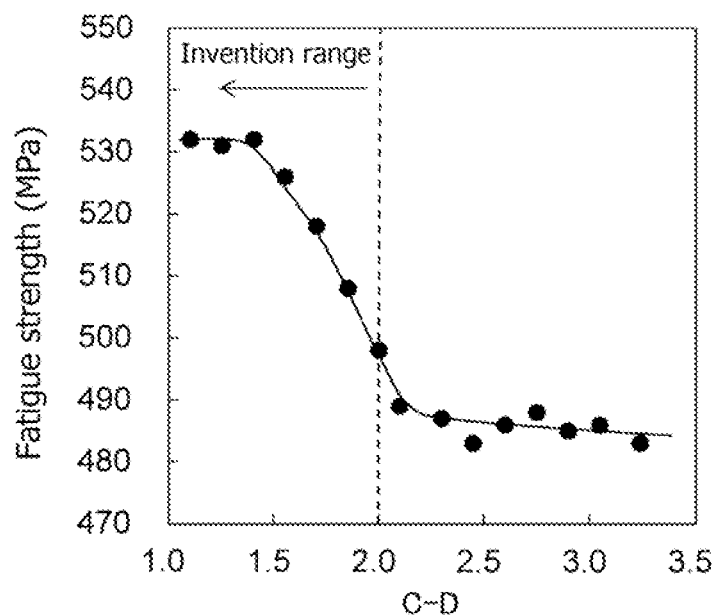
FIG. 1 is a graph showing an influence of C−D upon fatigue strength, where C is a strength at $\Phi=0°$ and $\varphi_1=0°$ and D is a strength at $\Phi=20°$ and $\varphi_1=0°$ in a section of $\varphi_2=45°$ of ODF obtained in a central layer of a sheet thickness.

There will be described an experiment that has led to the development of aspects of the invention.

A steel having a chemical composition comprising C: 0.0019 mass %, Si: 3.52 mass %, Mn: 0.41 mass %, P: 0.01 mass %, S: 0.0018 mass %, Al: 0.91 mass %, N: 0.0017 mass %, Ti: 0.0008 mass %, Nb: 0.0001 mass %, V: 0.0012 mass %, O: 0.0025 mass % and the remainder being Fe and inevitable impurities is melted by a common refining process and shaped into a raw steel material (slab) by a continuous casting method. The slab is then heated at a temperature of 1100° C. in a gas furnace for 30 minutes and subjected to a hot rolling comprised of a rough rolling and a finish rolling to form a hot-rolled sheet having a sheet thickness of 1.8 mm, which is wound up into a coil. In this case, the thickness of a sheet bar is 40 mm, and an entry side temperature FET in the finish rolling is 980° C., and an exit side temperature FDT (rolling end temperature) is 820° C., and a pass schedule in the finish rolling and a coiling temperature CT are changed variously.

Then, a test specimen is taken out from the hot-rolled sheet, subjected to a heat treatment simulating a hot-band annealing at 980° C. for 30 seconds in a laboratory, pickled and cold rolled to form a cold-rolled sheet having a final sheet thickness of 0.30 mm. The cold-rolled sheet is then subjected to a finish annealing at 740° C. for 20 seconds to form a finish-annealed sheet having a recrystallization ratio of 70% as an area ratio.

A test specimen is taken out from the thus-obtained finish-annealed sheet and subjected to the following tensile test and fatigue test.

In the tensile test, a JIS No. 5 tensile test piece with a tensile direction in the rolling direction is taken out from the test specimen, and a tensile strength TS thereof is measured according to JIS Z2241. In the fatigue test, a fatigue test specimen having a form and a size shown in FIG. 3 and a tensile direction in the rolling direction is taken out, and a fatigue strength thereof is measured after repetitions of $10^7$ times under conditions of pulsating tension loading, a stress ratio of 0.1, and a frequency of 20 Hz. As a result, it has been seen that the tensile strength TS is stable at about 620 MPa while the fatigue strength largely varies in accordance with the experimental conditions. In this regard, the fatigue strength means a maximum stress of an amplitude stress applied to the test piece.

Various studies has been made to investigate the cause for the variation of the fatigue strength, and as a result, it has been clarified that the fatigue strength is significantly affected by the texture of the steel sheet, concretely, the material having a low fatigue strength is high in the strength in the vicinity of {100}<011> orientation, that is, $(\Phi, \varphi_1, \varphi_2)=(0°, 0°, 45°)$ as an Euler angle while the material having a high fatigue strength is low in {100}<011> orientation and high in the strength in the vicinity of {114}<011> orientation, that is, $(\Phi, \varphi_1, \varphi_2)=(20°, 0°, 45°)$ as an Euler angle.

FIG. 1 shows a relation between C−D and a fatigue strength, where C is a strength at $\Phi=0°$ and $\varphi_1=0°$ and D is a strength at $\Phi=20°$ and $\varphi_1=0°$ in a section of $\varphi_2=45°$ of ODF (Crystalline Orientation Distribution Function) obtained in a central layer of a sheet thickness. As seen from FIG. 1, the fatigue strength rapidly increases when the value of C−D is not more than 2.0, while it is almost saturated when the value of C−D is not more than 1.5. In order to increase the fatigue strength, therefore, C−D is necessary to be not more than 2.0, and is more preferably not more than 1.5.

The inventors consider the mechanism as follows, although it has not been cleared sufficiently. In the section of $\varphi_2=45°$, the orientation group in the vicinity of $\varphi_1=0°$ and $\Phi=0$ to 50° corresponds to so-called α-fiber, which is known to be hard to be recrystallized. It is considered that non-recrystallized texture of the finish-annealed sheet belongs mainly to a-fiber. That it, when the recrystallization ratio is the same, the small value of C–D corresponds to large orientation dispersion in the non-recrystallized texture of the finish-annealed sheet and small {100}<011> orientation, which is considered to contribute to the increase in fatigue strength. In other words, it is considered that the non-recrystallized texture with the large orientation dispersion hardly causes the deformation along a particular crystal face and provides a high fatigue strength stably.

Also, {100}<011> orientation is known as a rolling stable orientation and has a property that the orientation hardly changes during cold rolling. Accordingly, in order to increase the orientation dispersion in the a-fiber, it is considered effective to decrease accumulation degree into {100}<011> orientation as a main orientation in the stage of the hot-rolled sheet (before the cold rolling) and promote crystal rotation in the subsequent cold rolling.

Figure 2:
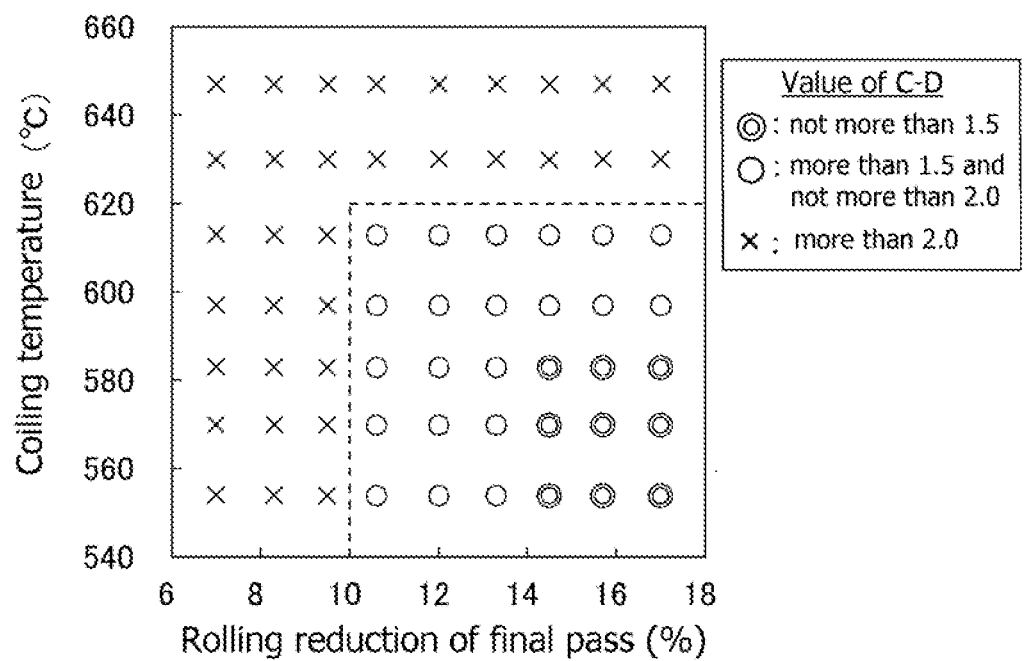
FIG. 2 is a graph showing an influence of a rolling reduction of a final finish rolling pass in hot rolling and a coiling temperature upon C−D, where C is a strength at $\Phi=0°$ and $\varphi_1=0°$ and D is a strength at $\Phi=20°$ and $\varphi_1=0°$ in a section of $\varphi_2=45°$ of ODF obtained in a central layer of a sheet thickness.

The inventors have performed various experiments to study a hot-rolling condition for decreasing the accumulation degree into {100}<011> orientation in the hot-rolled sheet, i.e., decreasing the value of C–D. As a result, as shown in FIG. 2, it has been found effective to increase the rolling reduction of the final pass in the finish rolling of the hot rolling and also lower the coiling temperature after the hot rolling, concretely, to increase the rolling reduction of the final pass to not less than 10% and decrease the coiling temperature to not higher than 620° C. Under such a condition, the dislocation density and stored energy of the hot-rolled sheet increase and thereby promote recrystallization in the hot-band annealing in all orientations to thus randomize the texture, as a result of which the orientation dispersion of the hot-band annealed sheet is considered to be promoted.

As mentioned above, the strength C at $\Phi=0°$ and $\varphi_1=0°$ in the section of $\varphi_2=45°$ of ODF is related to the non-recrystallized texture and decreases as the recrystallization progresses. In the steel sheet according to aspects of the invention, where the non-recrystallized texture remains, that is, the recrystallization ratio is less than 100% as an area ratio, the value of C is necessary to be not less than 2.0, preferably not less than 3.0.

Aspects of the invention were developed based on the above new knowledge.

The strength C at the orientation of $(\Phi, \varphi_1, \varphi_2)=(0°, 0°, 45°)$ and the strength D at the orientation of $(\Phi, \varphi_1, \varphi_2)=(20°, 0°, 45°)$ are determined by calculating ODF by a series expanding method or an ADC method using a plurality of pole figures (preferably not less than 3) selected from {110}, {200}, {211}, {310} pole figures and so on obtained by X-ray diffraction of a center layer of sheet thickness polished to ½ of the steel sheet thickness. In this regard, the measurements of C and D are not limited to the above methods and may be performed by using another well-known method, for example, a texture measurement through EBSP.

The reason of limiting the chemical composition of the raw steel material used in accordance with aspects of the invention will be described below.

C: Not More than 0.0050 Mass %

C is an element forming a carbide and deteriorating an iron loss of a product sheet. The content exceeding 0.0050 mass % causes the above adverse effect to be remarkable. Therefore, C is limited to not more than 0.0050 mass % from a viewpoint of suppressing magnetic aging of the product sheet, preferably to not more than 0.0030 mass %.

Si: 3.2 to 5.0 Mass %

Si has an effect of increasing a specific resistance of steel and reducing an iron loss. It also has an effect of increasing a strength of steel by solid-solution strengthening. The above effects become remarkable as Si content is high, and hence, Si is contained by not less than 3.2 mass % according to aspects of the invention. However, Si content exceeding 5.0 mass % causes the rolling to be difficult, so that the upper limit of Si is 5.0 mass %. Preferably, Si content falls within the range of 3.5 to 4.5 mass %.

Mn: Not More than 2.0 Mass %

Mn has an effect of increasing the specific resistance of steel and reducing the iron loss, like Si, and preferably contained by not less than 0.1 mass %. However, when Mn content exceeds 2.0 mass %, the iron loss is rather deteriorated by the precipitation of carbonitride, and therefore, Mn content is limited to not more than 2.0 mass %. Therefore, Mn is preferably added by 0.1 to 2.0 mass %, more preferably 0.3 to 1.0 mass %.

P: Not More than 0.02 Mass %

P is an element having a high solid-solution strengthening ability and used to adjust steel hardness. In the high-alloy steel as in accordance with aspects of the invention, the P content exceeding 0.02 mass % causes the rolling to be difficult due to embrittlement of steel, and hence, the upper limit of P is 0.02 mass %, preferably not more than 0.01 mass %.

S: Not More than 0.0050 Mass %

S is a harmful element forming fine sulfide and blocking grain growth to thereby increase the iron loss. In particularly, when S content exceeds 0.0050 mass %, the above adverse effect is remarkable. Hence, the upper limit is 0.0050 mass %, and preferably not more than 0.0030 mass %.

Al: 0.5 to 2.0 Mass %

Al has an effect of increasing the specific resistance of steel and reducing the iron loss, like Si. It also has an effect of increasing the strength of steel by solid-solution strengthening. However, the above effects are small when Al content is less than 0.5 mass %, while the rolling becomes difficult when it exceeds 2.0 mass %. Accordingly, the Al content is set to fall within the range of 0.5 to 2.0 mass %, preferably within the range of 0.7 to 1.3 mass %.

N: Not More than 0.0050 Mass %

N is a harmful element that increases fine nitride to block grain growth and increase the iron loss. In particular, when N content exceeds 0.0050 mass, the above adverse effect becomes remarkable. Hence, the upper limit is 0.0050 mass %, preferably not more than 0.0030 mass %.

Ti: Not More than 0.0030 Mass %

Ti is a harmful element that is precipitated as fine carbonitride to block grain growth and increase the iron loss. In particular, when Ti content exceeds 0.0030 mass %, the above adverse effect becomes remarkable. Hence, the upper limit is 0.0030 mass %, preferably not more than 0.0020 mass %.

Nb: Not More than 0.0010 Mass %

Nb is a harmful element that is precipitated as fine carbonitride to block grain growth and increase the iron loss, like Ti. In particular, when Nb content exceeds 0.0010 mass %, the above adverse effect becomes remarkable. Therefore, the upper limit is 0.0010 mass %, preferably not more than 0.0005 mass %.

V: Not More than 0.0050 Mass %

V is also a harmful element that is precipitated as fine carbonitride to block grain growth and increase the iron loss, like Ti. In particular, when V content exceeds 0.0050 mass %, the above adverse effect becomes remarkable. Hence, the upper limit is 0.0050 mass %, preferably not more than 0.0030 mass %.

O: Not More than 0.0050 Mass %

O is a harmful element forming oxide-based inclusions to block grain growth and increase the iron loss. In particularly, when O content exceeds 0.0050 mass %, the above adverse effect becomes remarkable. Hence, the upper limit is 0.0050 mass %, preferably more than 0.0030 mass %.

Si+Al: Not Less than 4.0 Mass %

The non-oriented electrical steel sheet according to aspects of the invention is necessary to contain Si and Al such that the total content adds up to not less than 4.0 mass %, in addition to satisfying the above chemical composition. When the total content of Si and Al is less than 4.0 mass %, it is difficult to stably secure a high strength and high fatigue strength. The total content of Si and Al is preferably not less than 4.4 mass %. However, when the total content of Si and Al exceeds 6.0 mass %, steel is hardened and the rolling becomes difficult. Hence, the upper limit is preferably about 6.0 mass %.

The raw steel material used in accordance with aspects of the invention may contain the following elements properly in addition to the above ingredients.

Sn and Sb: 0.005 to 0.20 Mass % Each

Sn and Sb have an effect of improving the recrystallized texture and reducing the iron loss. In order to obtain the above effect, it is necessary to add each element by not less than 0.005 mass %. On the other hand, when each ingredient is added by more than 0.20 mass %, the above effect is saturated. Therefore, Sn and Sb are each preferably added within the range of 0.005 to 0.20 mass %, more preferably, within the range of 0.01 to 0.10 mass %.

Ca, Mg and REM: 0.0005 to 0.010 Mass % Each

Ca, Mg and REM form stable sulfide and have an effect of decreasing fine sulfide and improving grain growth and the iron loss. In order to obtain the above effect, it is necessary to add each element by not less than 0.0005 mass %. On the other hand, when each element is added by more than 0.010 mass %, the iron loss is rather deteriorated. Therefore, Ca, Mg and REM are each preferable to be added within the range of 0.0005 to 0.010 mass %, more preferably within the range of 0.001 to 0.005 mass %.

The raw steel material used in accordance with aspects of the invention may contain properly the following elements in addition to the aforementioned elements. However, these elements are relatively high in the raw material cost, and it is desirable to suppress the addition amount thereof to the minimum necessary.

Cr: 0.01 to 5 Mass %

Cr has an effect of increasing the specific resistance of steel and thus reducing the iron loss, like Si. However, Cr is small in the solid-solution strengthening ability as compared to Si and Al, and accordingly it is preferable to be added when it is desired to decrease the iron loss without deteriorating the rolling property. When the addition amount is less than 0.01 mass %, the above effect cannot be obtained sufficiently, while when it exceeds 5 mass %, the effect of improving the iron loss is saturated. Therefore, Cr is preferable to be added by 0.01 to 5 mass %.

Cu: 0.01 to 5 Mass %

Cu has an effect of increasing the specific resistance of steel and thus reducing the iron loss, like Si. However, Cu is small in the solid-solution strengthening ability as compared to Si and Al, and accordingly it is preferable to be added when it is desired to reduce the iron loss without deteriorating the rolling property. When the addition amount is less than 0.01 mass, the above effect cannot be obtained sufficiently, while when it exceeds 5 mass %, the effect of improving the iron loss is saturated. Therefore, Cu is preferable to be added within the range of 0.01 to 5 mass %.

Ni: 0.01 to 5 Mass %

Ni is an element being large in the effect of increasing the strength of steel by solid-solution strengthening. When the addition amount is less than 0.01 mass %, the above effect cannot be obtained sufficiently, while when it exceeds 5 mass %, the raw material cost is largely increased. Therefore, Ni is preferable to be added by 0.01 to 5 mass %.

Mo: 0.0005 to 0.1 Mass %

Mo has an effect of coarsening carbide and thus reducing the iron loss. However, when the addition amount is less than 0.0005 mass %, the above effect cannot be obtained sufficiently, while when it exceeds 0.1 mass %, the effect of improving the iron loss is saturated. Therefore, Mo is preferable to be added by 0.0005 to 0.1 mass %.

W: 0.001 to 0.1 Mass %

W has an effect of coarsening carbide and reducing the iron loss, like Mo. However, when the addition amount is less than 0.001 mass %, the above effect cannot be obtained sufficiently, while when it exceeds 0.1 mass %, the effect of improving the iron loss is saturated. Therefore, W is preferable to be added by 0.001 to 0.1 mass %.

Co: 0.01 to 5 Mass %

Co is an element increasing the magnetic moment of Fe alloy and has an effect of increasing a magnetic flux density and reducing the iron loss. However, when the addition amount is less than 0.01 mass %, the above effects cannot be obtained sufficiently, while when it exceeds 5 mass %, the raw material cost is largely increased. Therefore, Co is preferable to be added by 0.01 to 5 mass %.

As: 0.001 to 0.05 Mass %

As is a grain boundary segregation element and has an effect of improving the texture and thus reducing the iron loss. The above effect is obtained by the addition of not less than 0.001 mass %. However, As is an element causing grain boundary embrittlement, and this adverse effect becomes particularly remarkable when it is added by more than 0.05 mass %. Therefore, As is preferable to be added within the range of 0.001 to 0.05 mass %.

B: 0.0001 to 0.005 Mass %

B is a grain boundary segregation element and has an effect of improving the texture and thus reducing the iron loss, like As. Since B is highly effective in suppressing the grain boundary migration, an excessive addition of B may rather block the grain growth in the stress-relief annealing to cause the increase in the iron loss. When the addition amount is less than 0.0001 mass %, the above effect cannot be obtained sufficiently, while when it exceeds 0.005 mass %, the adverse effect of suppressing the grain boundary migration increases. Therefore, B is preferable to be added by 0.0001 to 0.005 mass %.

In the non-oriented electrical steel sheet according to aspects of the invention, the remainder other than the above elements is Fe and inevitable impurities.

There will be described a method for producing a non-oriented electrical steel sheet according to aspects of the invention.

The non-oriented electrical steel sheet according to aspects of the invention can be produced by the usual production process of subjecting a raw steel material (slab) having a chemical composition in accordance with aspects of the invention to a hot rolling, a hot-band annealing, a single cold rolling or two or more cold rollings with an intermediate annealing between each cold rolling to form a cold-rolled sheet with a final sheet thickness, and a finish annealing.

It is preferable that the raw steel material (slab) be produced by melting a steel having a chemical composition adapted according to aspects of the invention by a usual refining process, where a molten steel obtained in a converter, an electric furnace or the like is subjected to a secondary refining in a vacuum degassing device or the like, to adjust to a given chemical composition, and then conducting a continuous casting method or an ingot making-blooming method.

The slab is then reheated to a given temperature in a gas furnace or the like and subjected to a hot rolling comprised of a rough rolling and a finish rolling to form a hot-rolled sheet. The temperature for reheating the slab is preferable to be not higher than 1150° C. to suppress re-solid solution of AlN, MnS or the like and preventing subsequent fine precipitation. More preferably, it is within the range of 1000 to 1130° C. When the hot rolling is performed immediately after the continuous casting, the reheating step of the slab may be omitted when the hot rolling temperature can be ensured. A thin slab caster constituted by integrating a continuous casting machine with a rolling machine can be used, where the hot rolling process may be omitted.

The hot rolling following the reheating of the slab is the most important step in accordance with aspects of the invention. To randomize the texture after the hot-band annealing, which will be described later, by increasing the dislocation density of the hot-rolled sheet and to increase the value of C–D, the final pass of the finish rolling is performed at a high rolling reduction and a coiling temperature of a coil after the hot rolling is lowered. Concretely, it is necessary that the rolling reduction of the final pass be not less than 10% and the coiling temperature be not higher than 620° C. When the rolling reduction of the final pass is less than 10% or the coiling temperature is higher than 620° C., the dislocation density in the hot-rolled sheet is decreased and the texture after the hot-band annealing is not sufficiently randomized. In order to surely obtain the above effects, it is preferable that the rolling reduction of the final pass be not less than 14% and the coiling temperature be not higher than 590° C.

Next, the hot-rolled sheet is subjected to a hot-band annealing, which is preferably conducted under soaking conditions of 700 to 1100° C. for 1 to 300 seconds. By increasing the dislocation density of the hot-rolled sheet, as mentioned above, the recrystallization during the hot-band annealing is promoted in all orientations, and hence the randomization of the texture is promoted. However, when the soaking temperature in the hot-band annealing is lower than 700° C., the effect by the hot-band annealing is insufficient, while when the soaking temperature exceeds 1100° C., the grain size becomes coarse and cracking is frequently caused in the cold rolling. The hot-band annealing is preferably conducted at 800 to 1000° C. for 5 to 100 seconds.

The hot-rolled sheet after the hot-band annealing is subjected to a single cold rolling or two or more cold rollings with an intermediate annealing between each rolling to form a cold-rolled sheet with a final sheet thickness.

The cold rolling is also an important step in accordance with aspects of the invention. In order to promote the crystal rotation from {100}<011> as an initial orientation into the other orientations and increase the orientation dispersion of the non-recrystallized structure, it is preferable to perform the rolling by decreasing the steel sheet temperature at an exit side of the first pass in the final cold rolling for rolling to the final sheet thickness, and/or to perform the rolling by increasing the rolling reduction at the first pass, concretely, by increasing the steel sheet temperature at the exit side of the first pass to not lower than 80° C., and/or by increasing the rolling reduction at the first pass to not less than 30%. When the steel sheet temperature at the exit side of the first pass is lower than 80° C. or when the rolling reduction at the first pass is less than 30%, the crystal rotation from {100}<011> to other orientations becomes insufficient. That is, as the steel sheet temperature is higher or the rolling reduction is higher, a plurality of slip systems are more active, and thus the crystal rotation to other orientations is easily caused and accumulation into {100}<011> is suppressed. It is preferable that steel sheet temperature at the exit side of the first pass be not lower than 100° C. and the rolling reduction at the first pass be not less than 40%. Moreover, the steel sheet temperature at the exit side of the first pass can be adjusted by raising the steel sheet temperature before the rolling or raising the temperature of a coolant or decreasing the amount of a coolant.

Next, the cold-rolled sheet, which has been cold rolled to have the final thickness, is subjected to a finish annealing. The finish annealing is also an important step in accordance with aspects of the invention. In order to reduce the iron loss by decreasing the dislocation density and also allow the non-recrystallized structure to be left to secure the strength, that is, to allow the recrystallization ratio to be less than 100%, it is important to control a soaking temperature in the finish annealing within the range of 600 to 800° C. When the soaking temperature is lower than 600° C., the dislocation density increases and the iron loss becomes too high, while when it exceeds 800° C., the recrystallization is promoted to make it difficult to stably retain the non-recrystallized texture and thus to make it difficult to ensure the high strength. The preferable soaking temperature is within the range of 680 to 760° C. The lower limit of the recrystallization ratio of the steel sheet after the finish annealing is not particularly defined, but an excessively low recrystallization ratio causes the iron loss to increase, so that it is preferably within the range of 30 to 95%. The recrystallization ratio can be easily measured by polishing a sectional face of the steel sheet parallel to the rolling direction, etching the face to reveal the microstructure and comparing an area ratio occupied with the recrystallized grains to an area ratio of the non-recrystallized zone.

It is preferable that the steel sheet after the finish annealing be coated with an insulation coating, if necessary. As the insulation coating may use any of known organic, inorganic and organic/inorganic mixed coatings in accordance with the purpose.

Aspects of the present invention achieve high strength by using a high alloy steel as a raw material and allowing the non-recrystallized structure to remain, and it is not necessary to conduct skin-pass rolling for considerably increasing the iron loss for the higher strength. Moreover, the presence or absence of the skin-pass rolling can be determined by texture observation with an optical microscope or EBSP.

The thus-obtained non-oriented electrical steel sheet according to aspects of the invention has such excellent properties as low iron loss and high strength, and accordingly is suitable as a raw material of a rotor core. On the other hand, when it is used in a stator core, an excellent motor efficiency may not be obtained due to the high iron loss. In this case, it is preferable that only the stator core be subjected to a stress-relief annealing after manufacturing the motor core by punching and laminating the steel sheet. In the stator core subjected to the stress-relief annealing, the recrystallization and grain growth are promoted to reduce the iron loss, allowing the motor efficiency to largely increase. This method is suitable to be used in PM motor being particularly low in the iron loss ratio of the rotor core.

EXAMPLES

A steel having a chemical composition shown in Table 1 and the remainder being Fe and inevitable impurities is melted by a usual refining process and formed into a slab by a continuous casting method. The slab is heated in a gas furnace at a temperature of 1100° C. for 30 minutes and subjected to a hot-rolling comprised of a rough rolling and a finish rolling to form a hot-rolled sheet having a sheet thickness of 1.8 mm. The hot-rolled sheet is subjected to a hot-band annealing at 930° C. for 30 seconds, pickled and cold-rolled to form a cold-rolled sheet with a final sheet thickness of 0.3 mm. The cold-rolled sheet is subjected to a finish annealing to form a product sheet. The conditions of the hot rolling, cold rolling and finish annealing are summarized and shown in Table 2.

Figure 3:
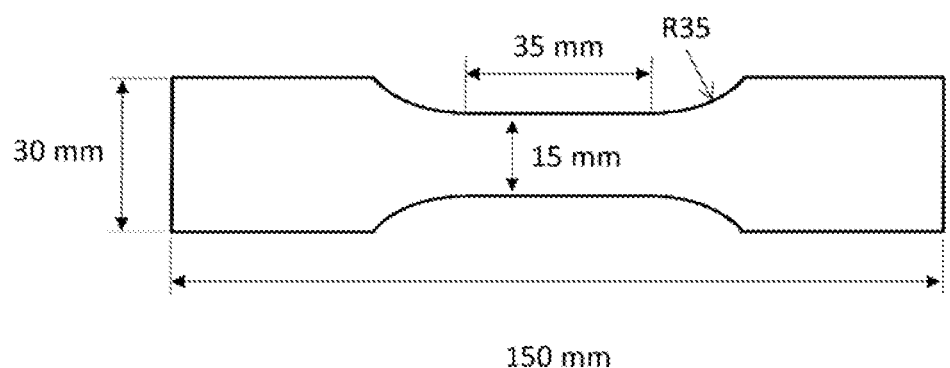
FIG. 3 is a schematic view illustrating a test specimen used in a fatigue test.

Then, samples are taken out from the thus-obtained product sheet and subjected to a tensile test and a fatigue test. In the tensile test, a JIS No. 5 tensile test specimen is taken out from the sample so as to have a tensile direction in the rolling direction to measure a tensile strength TS according to JIS Z2241. In the fatigue test, a fatigue test specimen having a shape and a size shown in FIG. 3 is taken out from the above sample so as to have a tensile direction in the rolling direction to measure a fatigue strength after repetitions of $10^7$ times under condition of a pulsating tension loading, a stress ratio of 0.1 and a frequency of 20 Hz.

Test pieces with a width of 30 mm and a length of 280 mm are taken out from L-direction (rolling direction) and C-direction (direction perpendicular to the rolling direction) of the above sample to measure an iron loss $W_{10/400}$ according to JIS C2550-1. Further, the iron loss $W_{10/400}$ after stress-relief annealing (SRA) in $N_2$ atmosphere at 800° C. for 2 hours is measured.

TABLE 1-1

| Steel Symbol | Chemical composition (mass %) | | | | | | | | | | | | |
|---|---|---|---|---|---|---|---|---|---|---|---|---|---|
| | C | P | Si | Mn | Al | S | N | O | Ti | Nb | V | Si + Al | Other elements | Remarks |
| A | 0.0019 | 0.01 | 3.78 | 0.62 | 0.82 | 0.0012 | 0.0014 | 0.0012 | 0.0005 | 0.0001 | 0.0017 | 4.60 | — | Invention steel |
| B | 0.0015 | 0.01 | 3.12 | 0.48 | 0.75 | 0.0011 | 0.0010 | 0.0013 | 0.0005 | 0.0001 | 0.0013 | 3.87 | — | Comparative steel |
| C | 0.0015 | 0.01 | 3.26 | 0.51 | 0.81 | 0.0012 | 0.0014 | 0.0015 | 0.0004 | 0.0002 | 0.0013 | 4.07 | — | Invention steel |
| D1 | 0.0018 | 0.01 | 3.55 | 0.55 | 0.75 | 0.0013 | 0.0013 | 0.0012 | 0.0004 | 0.0002 | 0.0011 | 4.30 | — | Invention steel |
| E | 0.0018 | 0.01 | 4.25 | 0.36 | 0.55 | 0.0013 | 0.0016 | 0.0014 | 0.0005 | 0.0002 | 0.0016 | 4.80 | — | Invention steel |
| F | 0.0016 | 0.01 | 4.67 | 0.41 | 0.62 | 0.0011 | 0.0016 | 0.0012 | 0.0005 | 0.0003 | 0.0018 | 5.29 | — | Invention steel |
| G | 0.0016 | 0.01 | 3.72 | 0.44 | 1.26 | 0.0011 | 0.0013 | 0.0011 | 0.0004 | 0.0002 | 0.0015 | 4.98 | — | Invention steel |
| H | 0.0018 | 0.01 | 3.45 | 0.55 | 1.82 | 0.0012 | 0.0014 | 0.0016 | 0.0004 | 0.0001 | 0.0010 | 5.27 | — | Invention steel |
| I | 0.0019 | 0.01 | 3.42 | 1.75 | 0.68 | 0.0015 | 0.0012 | 0.0016 | 0.0004 | 0.0001 | 0.0011 | 4.10 | — | Invention steel |
| J1 | 0.0018 | 0.01 | 3.77 | 0.56 | 0.78 | 0.0012 | 0.0013 | 0.0014 | 0.0004 | 0.0001 | 0.0019 | 4.54 | Sb: 0.021 | Invention steel |
| J2 | 0.0022 | 0.01 | 3.77 | 0.58 | 0.79 | 0.0012 | 0.0012 | 0.0010 | 0.0003 | 0.0002 | 0.0015 | 4.56 | Sb: 0.053 | Invention steel |
| K1 | 0.0016 | 0.01 | 3.69 | 0.62 | 0.81 | 0.0016 | 0.0015 | 0.0014 | 0.0004 | 0.0003 | 0.0019 | 4.50 | Sn: 0.048 | Invention steel |
| K2 | 0.0017 | 0.01 | 3.70 | 0.63 | 0.83 | 0.0014 | 0.0011 | 0.0015 | 0.0005 | 0.0002 | 0.0010 | 4.53 | Sn: 0.012 | Invention steel |
| L1 | 0.0017 | 0.01 | 3.75 | 0.63 | 0.78 | 0.0016 | 0.0013 | 0.0016 | 0.0004 | 0.0002 | 0.0018 | 4.53 | Ca: 0.004 | Invention steel |
| L2 | 0.0017 | 0.01 | 3.78 | 0.65 | 0.78 | 0.0017 | 0.0012 | 0.0015 | 0.0005 | 0.0002 | 0.0012 | 4.56 | Ca: 0.0016 | Invention steel |
| M1 | 0.0016 | 0.01 | 3.71 | 0.61 | 0.83 | 0.0013 | 0.0013 | 0.0012 | 0.0005 | 0.0001 | 0.0012 | 4.54 | Mg: 0.0012 | Invention steel |
| M2 | 0.0020 | 0.01 | 3.73 | 0.61 | 0.84 | 0.0015 | 0.0014 | 0.0013 | 0.0004 | 0.0002 | 0.0010 | 4.57 | Mg: 0.0025 | Invention steel |
| N1 | 0.0017 | 0.01 | 3.78 | 0.61 | 0.80 | 0.0014 | 0.0012 | 0.0016 | 0.0007 | 0.0002 | 0.0019 | 4.57 | REM: 0.0069 | Invention steel |
| N2 | 0.0020 | 0.01 | 3.79 | 0.64 | 0.82 | 0.0011 | 0.0012 | 0.0013 | 0.0004 | 0.0003 | 0.0019 | 4.61 | REM: 0.0015 | Invention steel |
| O | 0.0016 | 0.01 | 3.69 | 0.56 | 0.81 | 0.0055 | 0.0014 | 0.0011 | 0.0004 | 0.0001 | 0.0017 | 4.49 | — | Comparative steel |
| P | 0.0018 | 0.01 | 3.76 | 0.55 | 0.84 | 0.0038 | 0.0016 | 0.0014 | 0.0006 | 0.0002 | 0.0018 | 4.60 | — | Invention steel |
| Q | 0.0019 | 0.01 | 3.70 | 0.61 | 0.78 | 0.0011 | 0.0054 | 0.0010 | 0.0006 | 0.0002 | 0.0012 | 4.48 | — | Comparative steel |
| R | 0.0016 | 0.01 | 3.74 | 0.64 | 0.81 | 0.0013 | 0.0036 | 0.0014 | 0.0007 | 0.0003 | 0.0020 | 4.56 | — | Invention steel |
| S | 0.0015 | 0.01 | 3.68 | 0.55 | 0.77 | 0.0012 | 0.0015 | 0.0058 | 0.0005 | 0.0002 | 0.0017 | 4.45 | — | Comparative steel |
| T | 0.0018 | 0.01 | 3.70 | 0.63 | 0.84 | 0.0013 | 0.0013 | 0.0037 | 0.0003 | 0.0002 | 0.0019 | 4.54 | — | Invention steel |

TABLE 1-2

| Steel symbol | Chemical composition (mass %) | | | | | | | | | | | | |
|---|---|---|---|---|---|---|---|---|---|---|---|---|---|
| | C | P | Si | Mn | Al | S | N | O | Ti | Nb | V | Si + Al | Other elements | Remarks |
| U | 0.0018 | 0.01 | 3.70 | 0.62 | 0.79 | 0.0014 | 0.0014 | 0.0011 | 0.0036 | 0.0002 | 0.0017 | 4.49 | — | Comparative steel |
| V | 0.0020 | 0.01 | 3.71 | 0.57 | 0.80 | 0.0012 | 0.0013 | 0.0014 | 0.0022 | 0.0003 | 0.0016 | 4.51 | — | Invention steel |
| W | 0.0017 | 0.01 | 3.69 | 0.59 | 0.85 | 0.0012 | 0.0016 | 0.0014 | 0.0003 | 0.0015 | 0.0014 | 4.54 | — | Comparative steel |
| X | 0.0017 | 0.01 | 3.77 | 0.65 | 0.81 | 0.0013 | 0.0016 | 0.0013 | 0.0005 | 0.0006 | 0.0013 | 4.58 | — | Invention steel |
| Y | 0.0020 | 0.01 | 3.78 | 0.55 | 0.79 | 0.0011 | 0.0010 | 0.0012 | 0.0007 | 0.0002 | 0.0062 | 4.57 | — | Comparative steel |
| Z | 0.0019 | 0.01 | 3.69 | 0.64 | 0.81 | 0.0014 | 0.0013 | 0.0013 | 0.0004 | 0.0002 | 0.0037 | 4.50 | — | Invention steel |
| D2 | 0.0015 | 0.01 | 3.57 | 0.57 | 0.76 | 0.0011 | 0.0017 | 0.0013 | 0.0005 | 0.0002 | 0.0015 | 4.32 | Cr: 0.05 | Invention steel |
| D3 | 0.0015 | 0.01 | 3.57 | 0.56 | 0.76 | 0.0016 | 0.0013 | 0.0016 | 0.0004 | 0.0002 | 0.0016 | 4.33 | Cr: 2.3 | Invention steel |
| D4 | 0.0018 | 0.01 | 3.58 | 0.56 | 0.77 | 0.0010 | 0.0016 | 0.0016 | 0.0004 | 0.0001 | 0.0020 | 4.35 | Ni: 0.03 | Invention steel |
| D5 | 0.0018 | 0.01 | 3.56 | 0.57 | 0.77 | 0.0014 | 0.0016 | 0.0010 | 0.0006 | 0.0002 | 0.0010 | 4.33 | Ni: 1.5 | Invention steel |
| D6 | 0.0018 | 0.01 | 3.58 | 0.57 | 0.78 | 0.0010 | 0.0011 | 0.0015 | 0.0004 | 0.0002 | 0.0012 | 4.35 | Cu: 0.04 | Invention steel |
| D7 | 0.0016 | 0.01 | 3.56 | 0.57 | 0.75 | 0.0010 | 0.0012 | 0.0015 | 0.0005 | 0.0002 | 0.0018 | 4.31 | Cu: 1.2 | Invention steel |
| D8 | 0.0018 | 0.01 | 3.57 | 0.57 | 0.77 | 0.0017 | 0.0013 | 0.0013 | 0.0004 | 0.0002 | 0.0012 | 4.34 | Mo: 0.002 | Invention steel |

TABLE 1-2-continued

| Steel symbol | Chemical composition (mass %) | | | | | | | | | | | | | |
|---|---|---|---|---|---|---|---|---|---|---|---|---|---|---|
| | C | P | Si | Mn | Al | S | N | O | Ti | Nb | V | Si + Al | Other elements | Remarks |
| D9 | 0.0017 | 0.01 | 3.58 | 0.57 | 0.77 | 0.0013 | 0.0017 | 0.0012 | 0.0005 | 0.0001 | 0.0013 | 4.34 | Mo: 0.04 | Invention steel |
| D10 | 0.0017 | 0.01 | 3.56 | 0.57 | 0.77 | 0.0017 | 0.0011 | 0.0011 | 0.0005 | 0.0002 | 0.0018 | 4.33 | Co: 0.03 | Invention steel |
| D11 | 0.0015 | 0.01 | 3.57 | 0.57 | 0.76 | 0.0015 | 0.0016 | 0.0015 | 0.0004 | 0.0003 | 0.0012 | 4.33 | Co: 1.3 | Invention steel |
| D12 | 0.0018 | 0.01 | 3.57 | 0.55 | 0.76 | 0.0015 | 0.0017 | 0.0013 | 0.0005 | 0.0002 | 0.0010 | 4.33 | W: 0.006 | Invention steel |
| D13 | 0.0018 | 0.01 | 3.58 | 0.55 | 0.77 | 0.0017 | 0.0016 | 0.0010 | 0.0005 | 0.0001 | 0.0016 | 4.35 | W: 0.05 | Invention steel |
| D14 | 0.0019 | 0.01 | 3.57 | 0.57 | 0.75 | 0.0014 | 0.0017 | 0.0015 | 0.0007 | 0.0003 | 0.0016 | 4.33 | As: 0.004 | Invention steel |
| D15 | 0.0017 | 0.01 | 3.56 | 0.58 | 0.77 | 0.0013 | 0.0012 | 0.0013 | 0.0007 | 0.0001 | 0.0020 | 4.33 | As: 0.02 | Invention steel |
| D16 | 0.0016 | 0.01 | 3.56 | 0.58 | 0.76 | 0.0014 | 0.0014 | 0.0014 | 0.0003 | 0.0002 | 0.0013 | 4.32 | B: 0.0003 | Invention steel |
| D17 | 0.0018 | 0.01 | 3.58 | 0.58 | 0.75 | 0.0015 | 0.0014 | 0.0016 | 0.0006 | 0.0002 | 0.0019 | 4.33 | B: 0.0023 | Invention steel |
| D18 | 0.0018 | 0.003 | 3.57 | 0.56 | 0.77 | 0.0012 | 0.0015 | 0.0011 | 0.0003 | 0.0003 | 0.0011 | 4.33 | — | Invention steel |
| D19 | 0.0017 | 0.01 | 3.56 | 0.57 | 0.77 | 0.0002 | 0.0012 | 0.0016 | 0.0007 | 0.0002 | 0.0015 | 4.32 | — | Invention steel |

TABLE 2-1

| No | Steel symbol | Hot rolling | | Cold rolling | | Finish Annealing temperature (° C.) | Re-crystallization rate (%) | Texture C | Texture C-D | Properties of product sheet | | | | Remarks |
|---|---|---|---|---|---|---|---|---|---|---|---|---|---|---|
| | | Rolling reduction (%) of final pass | Coiling temperature (° C.) | Temperature (° C.) at exit side of first pass | Rolling Reduction (%) | | | | | Fatigue strength (MPa) | TS (MPa) | $W_{10/400}$ (W/kg) | $W_{10/400}$ (W/kg) after SRA | |
| 1 | A | 16 | 570 | 71 | 25 | 730 | 81 | 3.5 | 1.2 | 595 | 660 | 21.5 | 11.2 | Invention Example |
| 2 | A | 11 | 570 | 70 | 25 | 730 | 82 | 3.4 | 1.8 | 576 | 662 | 21.7 | 11.4 | Invention Example |
| 3 | A | 8 | 570 | 73 | 25 | 730 | 78 | 3.8 | 2.3 | 541 | 661 | 21.4 | 11.3 | Comparative Example |
| 4 | A | 16 | 610 | 72 | 25 | 730 | 79 | 3.4 | 1.7 | 581 | 658 | 21.6 | 11.3 | Invention Example |
| 5 | A | 16 | 630 | 73 | 25 | 730 | 80 | 3.5 | 2.2 | 540 | 660 | 21.5 | 11.4 | Comparative Example |
| 6 | A | 11 | 600 | 70 | 25 | 730 | 80 | 3.6 | 1.6 | 578 | 663 | 21.2 | 11.5 | Invention Example |
| 7 | A | 12 | 600 | 85 | 25 | 730 | 78 | 3.6 | 1.3 | 589 | 659 | 21.5 | 11.3 | Invention Example |
| 8 | A | 11 | 600 | 106 | 25 | 730 | 77 | 3.8 | 1.1 | 599 | 658 | 21.3 | 11.1 | Invention Example |
| 9 | A | 11 | 600 | 69 | 33 | 730 | 81 | 3.5 | 1.3 | 588 | 660 | 21.4 | 11.2 | Invention Example |
| 10 | A | 11 | 600 | 72 | 41 | 730 | 80 | 3.6 | 1.1 | 597 | 661 | 21.3 | 11.3 | Invention Example |
| 11 | A | 19 | 570 | 153 | 51 | 730 | 82 | 3.5 | 0.9 | 601 | 659 | 21.6 | 11.2 | Invention Example |
| 12 | A | 19 | 580 | 105 | 38 | 810 | 100 | 1.1 | 0.2 | 545 | 621 | 17.2 | 11.6 | Comparative Example |
| 13 | A | 18 | 580 | 108 | 39 | 770 | 92 | 2.6 | 1.2 | 585 | 640 | 19.5 | 11.1 | Invention Example |
| 14 | A | 18 | 580 | 110 | 40 | 680 | 51 | 4.1 | 1.3 | 642 | 688 | 27.1 | 11.2 | Invention Example |
| 15 | A | 17 | 580 | 111 | 40 | 630 | 28 | 5.6 | 1.2 | 685 | 741 | 32.3 | 11.5 | Invention Example |
| 16 | A | 18 | 570 | 109 | 39 | 580 | 0 | 7.6 | 1.4 | 699 | 786 | 40.6 | 11.7 | Invention Example |
| 17 | B | 18 | 580 | 105 | 39 | 730 | 80 | 3.5 | 1.4 | 545 | 580 | 22.6 | 11.9 | Comparative Example |
| 18 | B | 8 | 630 | 71 | 26 | 730 | 79 | 3.4 | 2.6 | 541 | 581 | 22.5 | 11.8 | Comparative Example |
| 19 | C | 16 | 590 | 108 | 37 | 730 | 81 | 3.4 | 1.2 | 561 | 601 | 22.2 | 11.7 | Invention Example |
| 20 | C | 9 | 640 | 71 | 26 | 730 | 82 | 3.3 | 2.5 | 538 | 603 | 22.1 | 11.6 | Comparative Example |
| 21 | D1 | 17 | 580 | 115 | 37 | 730 | 78 | 3.5 | 1.1 | 581 | 635 | 21.9 | 11.4 | Invention Example |
| 22 | D1 | 8 | 640 | 69 | 25 | 730 | 79 | 3.5 | 2.6 | 540 | 632 | 21.8 | 11.5 | Comparative Example |

TABLE 2-2

| No | Steel symbol | Hot rolling | | Cold rolling | | Finish annealing temperature (° C.) | Re-crystallization rate (%) | Texture C | Texture C-D | Properties of product sheet | | | | Remarks |
|---|---|---|---|---|---|---|---|---|---|---|---|---|---|---|
| | | Rolling reduction (%) of final pass | Coiling temperature (° C.) | Temperature (° C.) at exit side of first pass | Rolling reduction (%) | | | | | Fatigue strength (MPa) | TS (MPa) | $W_{10/400}$ (W/kg) | $W_{10/400}$ (W/kg) After SRA | |
| 23 | E | 18 | 580 | 110 | 39 | 730 | 80 | 3.3 | 1.1 | 638 | 703 | 19.9 | 10.7 | Invention Example |
| 24 | F | 18 | 580 | 111 | 39 | 730 | 78 | 3.5 | 1.2 | 669 | 735 | 19.3 | 10.2 | Invention Example |
| 25 | G | 18 | 580 | 113 | 40 | 730 | 82 | 3.4 | 1.3 | 611 | 675 | 19.6 | 10.5 | Invention Example |
| 26 | H | 17 | 580 | 105 | 39 | 730 | 81 | 3.8 | 1.1 | 613 | 678 | 19.4 | 10.3 | Invention Example |
| 27 | I | 18 | 570 | 103 | 42 | 730 | 79 | 3.5 | 1.0 | 572 | 609 | 21.4 | 11.3 | Invention Example |
| 28 | J | 17 | 510 | 101 | 40 | 730 | 80 | 3.4 | 0.9 | 598 | 660 | 21.0 | 10.9 | Invention Example |
| 29 | K | 18 | 520 | 113 | 40 | 730 | 80 | 3.4 | 1.1 | 599 | 665 | 20.9 | 10.8 | Invention Example |
| 30 | L | 19 | 550 | 114 | 39 | 730 | 79 | 3.6 | 1.2 | 603 | 663 | 21.2 | 10.5 | Invention Example |
| 31 | M | 18 | 570 | 109 | 39 | 730 | 81 | 3.5 | 0.8 | 601 | 661 | 21.3 | 10.6 | Invention Example |
| 32 | N | 18 | 580 | 111 | 42 | 730 | 81 | 3.5 | 1.1 | 600 | 660 | 21.5 | 10.6 | Invention Example |
| 33 | O | 17 | 580 | 112 | 39 | 730 | 79 | 3.3 | 1.0 | 615 | 678 | 22.5 | 14.3 | Comparative Example |

TABLE 2-2-continued

| | | Hot rolling | | Cold rolling | | Finish | Properties of product sheet | | | | | | | |
| | | | | Temper- | | | Re- | | | | | | | |
| | | Rolling | Coil- | ature | | anneal- | crystal- | | | | | | $W_{10/400}$ | |
| | | reduction | ing | (° C.) | Rolling | ing | lization | Tex- | Tex- | Fatigue | | | (W/kg) | |
| | Steel | (%) | temper- | at exit | reduc- | temper- | rate | ture | ture | strength | TS | $W_{10/400}$ | After | |
| No | symbol | of final pass | ature (° C.) | side of first pass | tion (%) | ature (° C.) | (%) | C | C-D | (MPa) | (MPa) | (W/kg) | SRA | Remarks |
|---|---|---|---|---|---|---|---|---|---|---|---|---|---|---|
| 34 | P | 17 | 580 | 105 | 39 | 730 | 82 | 3.3 | 1.3 | 605 | 661 | 21.8 | 11.6 | Invention Example |
| 35 | Q | 18 | 570 | 110 | 41 | 730 | 80 | 3.6 | 1.0 | 613 | 685 | 22.4 | 14.0 | Comparative Example |
| 36 | R | 19 | 580 | 108 | 39 | 730 | 79 | 3.3 | 1.2 | 604 | 665 | 21.7 | 11.7 | Invention Example |
| 37 | S | 18 | 580 | 112 | 40 | 730 | 83 | 3.5 | 1.3 | 614 | 672 | 22.6 | 13.5 | Comparative Example |
| 38 | T | 17 | 580 | 109 | 42 | 730 | 80 | 3.3 | 1.0 | 606 | 663 | 21.9 | 11.5 | Invention Example |
| 39 | U | 19 | 570 | 105 | 41 | 730 | 80 | 3.4 | 1.2 | 611 | 681 | 22.4 | 14.2 | Comparative Example |
| 40 | V | 16 | 580 | 113 | 38 | 730 | 79 | 3.3 | 1.2 | 608 | 662 | 21.8 | 11.6 | Invention Example |
| 41 | W | 18 | 580 | 110 | 39 | 730 | 78 | 3.2 | 1.0 | 615 | 680 | 22.3 | 14.6 | Comparative Example |
| 42 | X | 17 | 580 | 110 | 40 | 730 | 80 | 3.3 | 1.2 | 605 | 665 | 21.8 | 11.7 | Invention Example |
| 43 | Y | 19 | 580 | 113 | 43 | 730 | 81 | 3.5 | 1.1 | 614 | 683 | 22.5 | 13.8 | Comparative Example |
| 44 | Z | 18 | 580 | 109 | 40 | 730 | 82 | 3.3 | 1.1 | 604 | 664 | 21.9 | 11.8 | Invention Example |

TABLE 2-3

| | | Hot rolling | | Cold rolling | | Finish | Properties of product sheet | | | | | | | |
| | | | | Temper- | | | Re- | | | | | | | |
| | | Rolling | Coil- | ature | | anneal- | crystal- | | | | | | $W_{10/400}$ | |
| | | reduction | ing | (° C.) | Rolling | ing | lization | | | Fatigue | | | (W/kg) | |
| | Steel | of final | temper- | at exit | reduc- | temper- | rate | Texture | Texture | strength | TS | $W_{10/400}$ | after | |
| No | symbol | pass (%) | ature (° C.) | side of first pass | tion (%) | ature (° C.) | (%) | C | C-D | (MPa) | (MPa) | (W/kg) | SRA | Remarks |
|---|---|---|---|---|---|---|---|---|---|---|---|---|---|---|
| 45 | J2 | 18 | 500 | 103 | 41 | 730 | 81 | 3.3 | 0.8 | 599 | 665 | 21.2 | 10.7 | Invention Example |
| 46 | K2 | 17 | 530 | 115 | 40 | 730 | 80 | 3.5 | 1.2 | 601 | 661 | 21.0 | 10.9 | Invention Example |
| 47 | L2 | 18 | 550 | 116 | 40 | 730 | 82 | 3.7 | 1.1 | 601 | 661 | 21.2 | 10.6 | Invention Example |
| 48 | M2 | 19 | 560 | 108 | 41 | 730 | 80 | 3.5 | 0.9 | 598 | 664 | 21.4 | 10.5 | Invention Example |
| 49 | N2 | 17 | 570 | 115 | 39 | 730 | 79 | 3.4 | 1.0 | 602 | 663 | 21.5 | 10.7 | Invention Example |
| 50 | D2 | 18 | 580 | 107 | 39 | 730 | 78 | 3.4 | 1.1 | 584 | 638 | 21.8 | 11.2 | Invention Example |
| 51 | D3 | 18 | 580 | 108 | 38 | 730 | 78 | 3.5 | 1.2 | 578 | 635 | 21.3 | 10.6 | Invention Example |
| 52 | D4 | 18 | 570 | 107 | 38 | 730 | 77 | 3.5 | 1.2 | 589 | 645 | 21.7 | 11.2 | Invention Example |
| 53 | D5 | 18 | 580 | 106 | 38 | 730 | 78 | 3.5 | 1.1 | 605 | 662 | 21.5 | 11.0 | Invention Example |
| 54 | D6 | 18 | 570 | 115 | 40 | 730 | 78 | 3.4 | 1.1 | 585 | 632 | 21.8 | 11.2 | Invention Example |
| 55 | D7 | 18 | 580 | 111 | 37 | 730 | 77 | 3.4 | 1.2 | 576 | 638 | 21.5 | 10.7 | Invention Example |
| 56 | D8 | 18 | 580 | 109 | 39 | 730 | 79 | 3.4 | 1.1 | 584 | 639 | 21.8 | 11.4 | Invention Example |
| 57 | D9 | 18 | 580 | 106 | 38 | 730 | 79 | 3.4 | 1.2 | 575 | 631 | 21.8 | 11.4 | Invention Example |
| 58 | D10 | 17 | 570 | 106 | 38 | 730 | 78 | 3.5 | 1.1 | 578 | 633 | 21.9 | 11.3 | Invention Example |
| 59 | D11 | 19 | 570 | 106 | 38 | 730 | 79 | 3.5 | 1.1 | 584 | 635 | 21.9 | 11.3 | Invention Example |
| 60 | D12 | 17 | 570 | 112 | 37 | 730 | 79 | 3.4 | 1.1 | 577 | 634 | 21.8 | 11.4 | Invention Example |
| 61 | D13 | 18 | 580 | 107 | 38 | 730 | 78 | 3.5 | 1.0 | 581 | 636 | 21.9 | 11.3 | Invention Example |
| 62 | D14 | 18 | 580 | 108 | 37 | 730 | 78 | 3.4 | 1.2 | 581 | 637 | 21.8 | 11.4 | Invention Example |
| 63 | D15 | 18 | 570 | 110 | 39 | 730 | 78 | 3.5 | 1.1 | 579 | 634 | 21.9 | 11.3 | Invention Example |
| 64 | D16 | 18 | 580 | 110 | 38 | 730 | 78 | 3.5 | 1.0 | 581 | 640 | 21.9 | 11.4 | Invention Example |
| 65 | D17 | 19 | 580 | 112 | 39 | 730 | 77 | 3.5 | 1.2 | 576 | 636 | 21.9 | 11.3 | Invention Example |
| 66 | D18 | 18 | 570 | 114 | 40 | 730 | 79 | 3.4 | 1.2 | 579 | 631 | 21.9 | 11.4 | Invention Example |
| 67 | D19 | 18 | 570 | 109 | 38 | 730 | 78 | 3.5 | 1.2 | 583 | 636 | 21.8 | 11.3 | Invention Example |

The measurement results are also shown in Table 2. As seen from these results, all the steel sheets produced by using the raw steel materials having the chemical composition adapted according to aspects of the invention under the conditions adapted according to aspects of the invention have high strength (tensile strength and fatigue strength) and low iron loss.

The invention claimed is:

1. A non-oriented electrical steel sheet having a chemical composition comprising C: not more than 0.0050 mass %, Si: 3.2 to 5.0 mass %, Mn: not more than 2.0 mass %, P: not more than 0.02 mass %, S: not more than 0.0050 mass %, Al: 0.5 to 2.0 mass %, N: not more than 0.0050 mass %, Ti: not more than 0.0030 mass %, Nb: not more than 0.0010 mass %, V: not more than 0.0050 mass %, O: not more than 0.0050 mass %, provided that Si+Al≥4.07 mass %, and the remainder being Fe and inevitable impurities, characterized in that
 a recrystallization ratio is 92% or less as an area ratio,
 a strength C is not less than 2.0, and
 a strength difference C-D is not more than 2.0,
 where C is a strength at $\Phi=0°$ and $\varphi_1=0°$ and D is a strength at $\Phi=20°$ and $\varphi_1=0°$ in a section of $\varphi_2=45°$ of Crystalline Orientation Distribution Function obtained in a central layer of a sheet thickness.

2. The non-oriented electrical steel sheet according to claim 1, wherein
 the non-oriented electrical steel sheet contains at least one group selected from following groups A to C:
 Group A: one or two selected from Sn and Sb by 0.005 to 0.20 mass % each, Group B: one or more selected from Ca, Mg and REM by 0.0005 to 0.010 mass % each, and Group C: at least one selected from Cr: 0.01 to 5 mass %, Cu: 0.01 to 5 mass %, Ni: 0.01 to 5 mass %, Mo: 0.0005 to 0.1 mass %, W: 0.001 to 0.1 mass %, Co: 0.01 to 5 mass %, As: 0.001 to 0.05 mass % and B: 0.0001 to 0.005 mass %, in addition to the above chemical composition.

\* \* \* \* \*